US009568012B2

(12) United States Patent
Aso et al.

(10) Patent No.: US 9,568,012 B2
(45) Date of Patent: Feb. 14, 2017

(54) PUMP, REFRIGERATION CYCLE APPARATUS, AND METHOD FOR MANUFACTURING PUMP

(75) Inventors: Hiroki Aso, Tokyo (JP); Kazunori Sakanobe, Tokyo (JP); Mineo Yamamoto, Tokyo (JP); Hiroyuki Ishii, Tokyo (JP); Junichiro Oya, Tokyo (JP); Yuto Urabe, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 238 days.

(21) Appl. No.: 14/375,297

(22) PCT Filed: Jan. 31, 2012

(86) PCT No.: PCT/JP2012/000596
§ 371 (c)(1),
(2), (4) Date: Sep. 16, 2014

(87) PCT Pub. No.: WO2013/114431
PCT Pub. Date: Aug. 8, 2013

(65) Prior Publication Data
US 2015/0052935 A1  Feb. 26, 2015

(51) Int. Cl.
*F04D 25/06* (2006.01)
*F04D 13/06* (2006.01)
(Continued)

(52) U.S. Cl.
CPC ............. *F04D 25/06* (2013.01); *F04D 13/064* (2013.01); *F04D 17/10* (2013.01); *F04D 29/026* (2013.01);
(Continued)

(58) Field of Classification Search
CPC ........ F04D 25/06; F04D 29/026; F04D 17/10; F04D 13/064; F05D 2230/20; F05D 2300/43; F25B 41/00; H02K 11/215; H02K 15/022; H02K 15/095
See application file for complete search history.

(56) References Cited

FOREIGN PATENT DOCUMENTS

JP     03-074151 A      3/1991
JP     06-315245 A     11/1994
(Continued)

OTHER PUBLICATIONS

Japanese Office Action mailed on Jun. 16, 2015 in the corresponding JP application No. 2013-556009. (English translation attached).
(Continued)

*Primary Examiner* — Emmanuel Duke
(74) *Attorney, Agent, or Firm* — Posz Law Group, PLC

(57) ABSTRACT

In a rotor portion, a magnet formed in a cylindrical shape, a first magnet holder that holds an impeller-attachment-portion-side end portion of the magnet, a second magnet holder that holds a magnetic-pole-position-detection-element-side end portion of the magnet, a back yoke disposed inside the magnet, a sleeve bearing disposed inside the back yoke, and a position detection magnet that is provided on a surface of the second magnet holder at a side opposite to the side at which the magnet is attached and allows a magnetic flux of the position detection magnet to be detected by the magnetic-pole-position detection element are assembled integrally together with a thermoplastic resin, and the impeller attachment portion is formed of the thermoplastic resin.

14 Claims, 16 Drawing Sheets

(51) Int. Cl.
  *H02K 1/27* (2006.01)
  *H02K 7/14* (2006.01)
  *F04D 17/10* (2006.01)
  *F25B 41/00* (2006.01)
  *H02K 15/02* (2006.01)
  *H02K 15/095* (2006.01)
  *F04D 29/02* (2006.01)
  *H02K 15/03* (2006.01)
  *H02K 15/12* (2006.01)

(52) U.S. Cl.
  CPC ............... *F25B 41/00* (2013.01); *H02K 1/278* (2013.01); *H02K 7/14* (2013.01); *H02K 11/215* (2016.01); *H02K 15/022* (2013.01); *H02K 15/095* (2013.01); *F05D 2230/20* (2013.01); *F05D 2300/43* (2013.01); *H02K 15/03* (2013.01); *H02K 15/12* (2013.01); *Y10T 29/49012* (2015.01)

(56) References Cited

FOREIGN PATENT DOCUMENTS

| | | |
|---|---|---|
| JP | 2005-323452 A | 11/2005 |
| JP | 2009-197729 A | 9/2009 |
| JP | 4479337 B2 | 3/2010 |
| JP | 2011-188701 A | 9/2011 |
| JP | 2011188701 A * | 9/2011 |

OTHER PUBLICATIONS

International Search Report of the International Searching Authority mailed Apr. 24, 2012 for the corresponding international application No. PCT/JP2012/000596 (and English translation).

Office Action issued Jan. 12, 2016 in the corresponding JP application No. 2013-556009 (with English translation).

* cited by examiner

F I G. 4
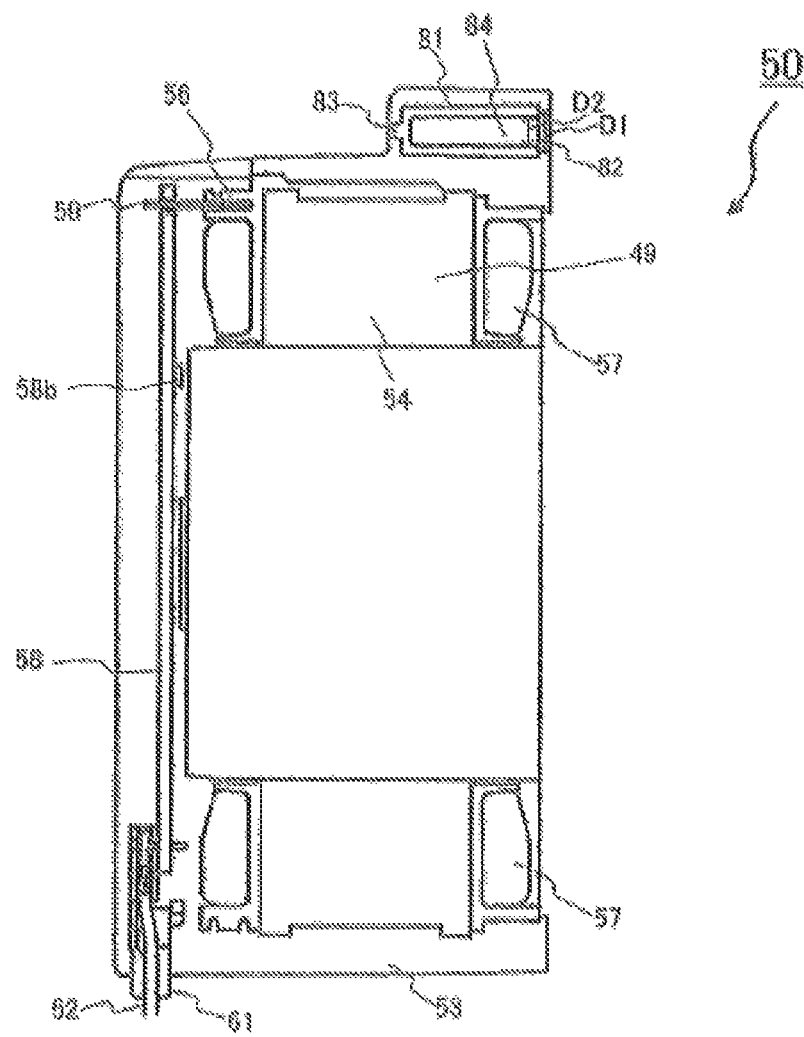

PUMP, REFRIGERATION CYCLE APPARATUS, AND METHOD FOR MANUFACTURING PUMP

CROSS REFERENCE TO RELATED APPLICATION

This application is a U.S. national stage application of PCT/JP2012/000596 filed on Jan. 31, 2012, the contents of which are incorporated herein by reference.

TECHNICAL FIELD

The present invention relates to a pump, a refrigeration cycle apparatus, such as an air-conditioning apparatus, a floor heating apparatus, or a hot-water supplying apparatus, and a method for manufacturing the pump.

BACKGROUND

Pumps including a brushless motor which includes a cylindrical magnet that is externally coated with resin and a Hall element that detects positions of magnetic poles of the magnet have been proposed. The brushless motor generates a rotating magnetic field by applying a current to coils in accordance with a signal from the Hall element that has detected the positions of the magnetic poles of the magnet (see, for example, Patent Literature 1).

PATENT LITERATURE

Patent Literature 1: Japanese Unexamined Patent Application Publication No. 2005-323452 (see, for example, Claim 1 and FIG. 1)

In the pump according to Patent Literature 1, the magnet is fixed by coating an outer peripheral portion thereof with the resin. Therefore, the thickness of the resin with which the outer peripheral portion of the magnet is covered is increased. When the thickness of the resin on the outer peripheral portion of the magnet is increased, the distance between the stator and the magnet is increased, and there is a possibility that the performance of the motor that drives the pump will be reduced.

According to the technology described in Patent Literature 1, projections are provided on a surface of the magnet, the surface opposing the position detection element. The magnetic flux generated by the projections is smaller than the main magnetic flux of the magnet. Therefore, there is a possibility that the magnetic flux generated by the projections and applied to the Hall element will be insufficient and the position detection accuracy will be reduced.

SUMMARY

The present invention has been made to solve at least one of the above-described problems, and its object is to provide a pump in which the distance between the magnet and the stator can be reduced and the performance of the pump can be improved.

A pump according to the present invention includes a molded stator including a board on which a magnetic-pole-position detection element is mounted; and a rotor including a rotor portion that is rotatably accommodated in a cup-shaped partition wall component, the rotor portion opposing the magnetic-pole-position detection element at one end and having an impeller attachment portion for attaching an impeller at the other end. In the rotor portion, a magnet formed in a cylindrical shape, a first magnet holder that holds an impeller-attachment-portion-side end portion (an end portion in the side on which the impeller-attachment portion is provided) of the magnet, a second magnet holder that holds a magnetic-pole-position-detection-element-side end portion (an end portion in a side on which the magnetic-pole-position detection element is provided) of the magnet, a back yoke disposed inside the magnet, a sleeve bearing disposed inside the back yoke, and a position detection magnet that is provided on a surface of the second magnet holder at a side opposite to the side at which the magnet is attached and allows a magnetic flux of the position detection magnet to be detected by the magnetic-pole-position detection element are assembled integrally together with a thermoplastic resin, and, at a same time, the impeller attachment portion is formed of the thermoplastic resin.

According to the pump of the present invention, since both end portions of the magnet are held by the first and second magnet holders, the outer peripheral portion of the magnet is exposed and the distance between the stator and the magnet can be reduced accordingly. As a result, the performance of the pump can be improved.

BRIEF DESCRIPTION OF DRAWINGS

FIG. 4 is a sectional view of the molded stator of the pump according to Embodiment of the present invention.

DETAILED DESCRIPTION

Embodiment of the present invention will now be described with reference to the drawings.

Figure 1:
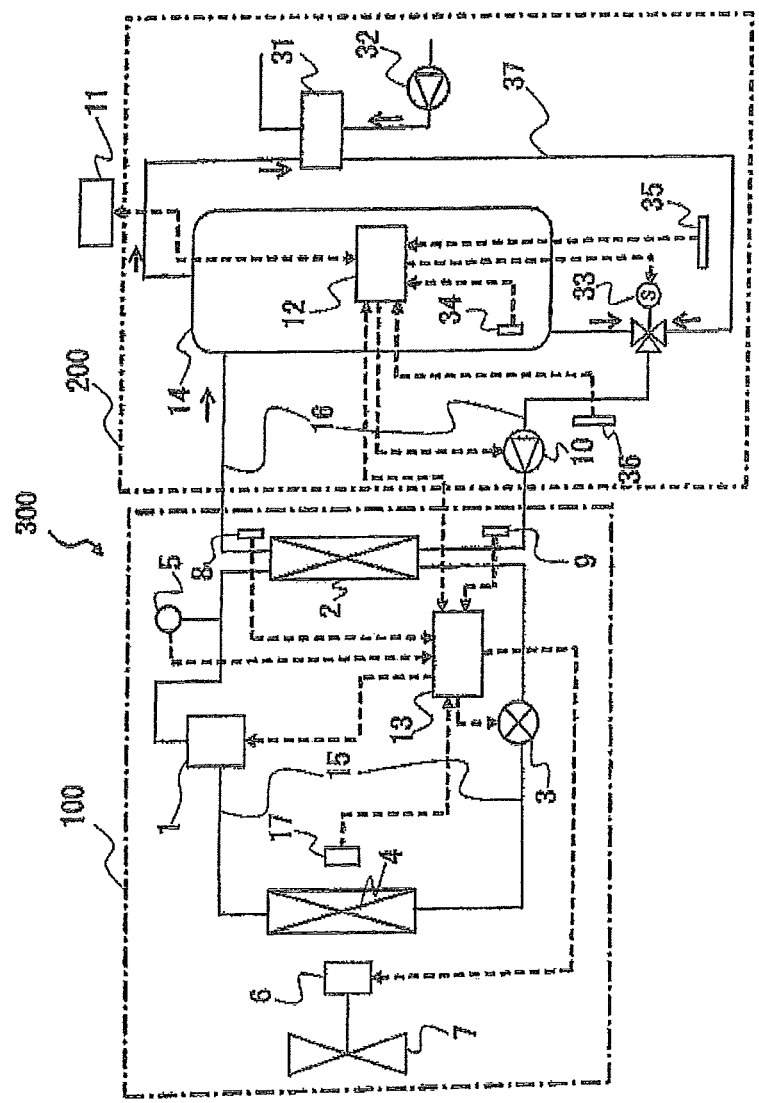
FIG. 1 is a diagram illustrating an example of a circuit configuration of a heat-pump-type hot-water supplying apparatus according to Embodiment of the present invention.

FIG. 1 is a schematic circuit diagram illustrating an example of a circuit configuration of a heat-pump-type hot-water supplying apparatus 300 (hereinafter referred to as a hot-water supplying apparatus 300) according to Embodiment of the present invention. The schematic structure of the heat-pump-type hot-water supplying apparatus, which is an example of a refrigeration cycle apparatus including a pump according to Embodiment of the present invention, will be briefly described with reference to FIG. 1. In each of the figures, including FIG. 1, described below, the relationships between the sizes of the components may differ from those in practice.

The hot-water supplying apparatus 300 is an example of a refrigeration cycle apparatus including a refrigerant circuit, and includes a heat pump unit 100, a tank unit 200, and an operation unit 11 which is, for example, operated by a user.

Referring to FIG. 1, the heat pump unit 100 includes a compressor 1 (a rotary compressor, a scroll compressor, a sliding vane compressor, etc.) that compresses refrigerant; a refrigerant-water heat exchanger 2 that causes the refrigerant and water to exchange heat; a decompression device 3 that decompresses and expands high-pressure refrigerant; an evaporator 4 that evaporates low-pressure two-phase refrigerant; a pressure detecting device 5 that detects a discharge pressure of the compressor 1; heating-temperature detecting means 8 for the refrigerant-water heat exchanger 2; water-supply-temperature detecting means 9 for the refrigerant-water heat exchanger 2; outside-air-temperature detecting means 17; a fan 7 that blows air toward the evaporator 4; a fan motor 6 that drives the fan 7; and a heat-pump-unit controller 13.

The compressor 1, the refrigerant side of the refrigerant-water heat exchanger 2, the decompression device 3, and the evaporator 4 are connected in a loop with refrigerant pipes 15 to form a refrigerant circuit. The heat-pump-unit controller 13 receives signals from the pressure detecting device 5, the heating-temperature detecting means 8, the water-supply-temperature detecting means 9, and the outside-air-temperature detecting means 17, and performs rotation speed control of the compressor 1, opening degree control of the decompression device 3, and rotation speed control of the fan motor 6. The heat-pump-unit controller 13 also transmits/receives signals to/from a tank-unit controller 12.

The tank unit 200 includes a hot-water tank 14 that reserves hot water that has been heated as a result of heat exchange between high-temperature, high-pressure refrigerant and water in the refrigerant-water heat exchanger 2; a bath-water-reheating heat exchanger 31 that reheats bath water; a bath-water circulating device 32; a pump 10, which is a hot-water circulating device disposed between the refrigerant-water heat exchanger 2 and the hot-water tank 14; a mixing valve 33 connected to the pump 10, the hot-water tank 14, and the bath-water-reheating heat exchanger 31; a tank-water-temperature detecting device 34; a reheated-water-temperature detecting device 35 that detects the temperature of the water that has passed through the bath-water-reheating heat exchanger 31; a mixed-water-temperature detecting device 36 that detects the temperature of the water that has passed through the mixing valve 33; and the tank-unit controller 12.

The hot-water tank 14, the mixing valve 33, the pump 10, and the water side of the refrigerant-water heat exchanger 2 are connected to each other with hot-water circulating pipes 16. Also, the hot-water tank 14 and the mixing valve 33 are connected to each other with bath-water reheating pipes 37. The tank-unit controller 12 receives signals from the tank-water-temperature detecting device 34, the reheated-water-temperature detecting device 35, and the mixed-water-temperature detecting device 36, and performs rotation speed control of the pump 10 and opening and closing control of the mixing valve 33. The tank-unit controller 12 also transmits/receives signals to/from the operation unit 11. Although the tank-unit controller 12 is illustrated as if it is disposed inside the hot-water tank 14 in FIG. 1, the tank-unit controller 12 is disposed outside the hot-water tank 14 in practice.

The operation unit 11 is, for example, a remote control unit or an operation panel including switches or the like which allows the user to set the temperature of hot water or issue an instruction for causing hot water to be discharged.

A normal water heating operation of the hot-water supplying apparatus 300 having the above-described structure will now be described. When an instruction for a water heating operation is transmitted from the operation unit 11 or the tank unit 200 to the heat-pump-unit controller 13, the heat-pump-unit controller 13 executes the water heating operation by controlling each actuator (drive components including the compressor 1, the decompression device 3, and the fan motor 6).

More specifically, the heat-pump-unit controller 13, which is included in the heat pump unit 100, performs rotation speed control of the compressor 1, opening degree control of the decompression device 3, and rotation speed control of the fan motor 6 on the basis of, for example, detection values of the pressure detecting device 5, the heating-temperature detecting means 8, the water-supply-temperature detecting means 9, and the outside-air-temperature detecting means 17 and information from the operation unit 11 transmitted from the tank-unit controller 12.

In addition, the detection value obtained by the heating-temperature detecting means 8 is transmitted between the heat-pump-unit controller 13 and the tank-unit controller 12, and the tank-unit controller 12 controls the rotation speed of the pump 10 so that the temperature detected by the heating-temperature detecting means 8 approaches a target heating temperature.

In the hot-water supplying apparatus 300 that is controlled as described above, the high-temperature, high-pressure refrigerant discharged from the compressor 1 is supplied to the refrigerant-water heat exchanger 2, where the temperature of the refrigerant is reduced while heat is transferred to the water supply circuit. The high-pressure, low-temperature refrigerant that has transferred heat and passed through the refrigerant-water heat exchanger 2 is decompressed in the decompression device 3. The refrigerant that has passed through the decompression device 3 flows into the evaporator 4, where the refrigerant receives heat from the outside air. The low-pressure refrigerant that has flowed out of the evaporator 4 is sucked into the compressor 1, and is circulated. Thus, a refrigeration cycle is formed.

Water in a lower section of the hot-water tank 14 is guided to the refrigerant-water heat exchanger 2 by the operation of the pump 10, which is the hot-water circulating device. The water is heated by the heat transferred from the refrigerant-water heat exchanger 2. The heated hot water passes through the hot-water circulating pipes 16, and is returned to an upper section of the hot-water tank 14 so that the heat is accumulated.

As described above, in the hot-water supplying apparatus 300, the pump 10, which is the hot-water circulating device that circulates the hot water, is provided in the hot-water circulating pipe 16 between the hot-water tank 14 and the refrigerant-water heat exchanger 2.

Figure 2:
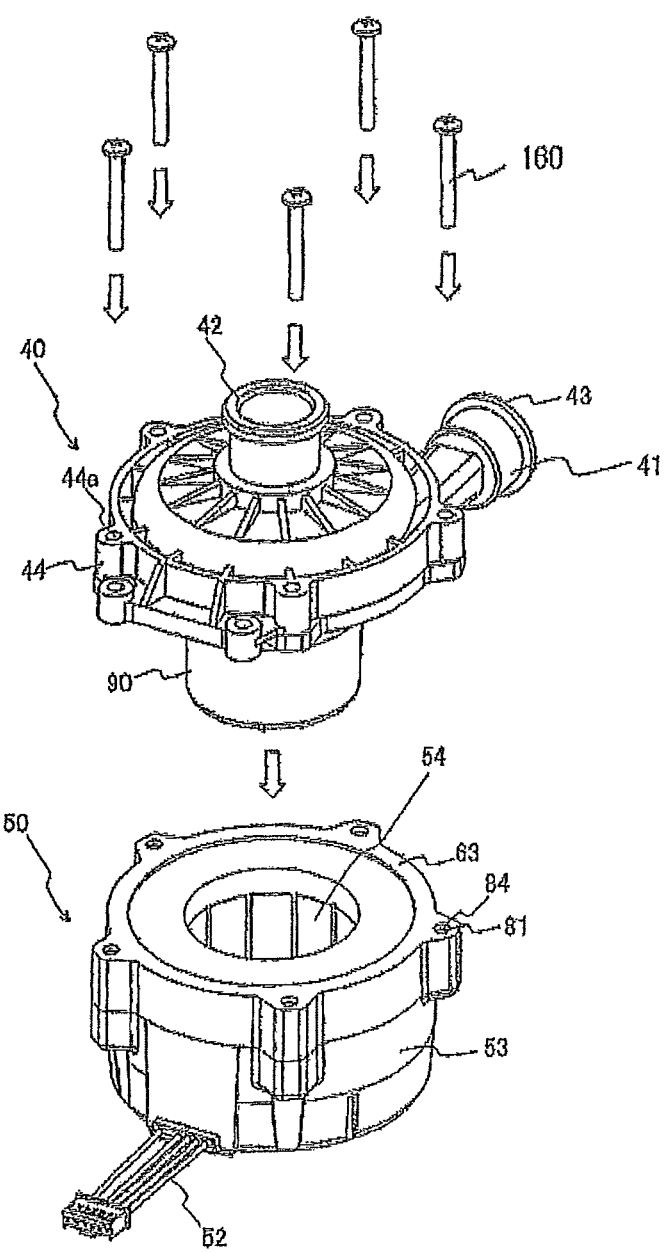
FIG. 2 is an exploded perspective view of a pump according to Embodiment of the present invention.

Next, the pump 10 according to Embodiment of the present invention, which is used as a hot-water circulating device, will be described. FIG. 2 is an exploded perspective view of the pump 10.

As illustrated in FIG. 2, the pump 10 includes a pump unit 40 that sucks in and discharges water by rotating a rotor (described below), a molded stator 50 having a mechanism that drives the rotor, and self-tapping screws 160 (five self-tapping screws are provided in the example of FIG. 2), which serve as fastening screws for fastening the pump unit 40 and the molded stator 50 together. The number of self-tapping screws 160 is not limited to five.

The pump 10 is assembled by inserting the five self-tapping screws 160 through screw holes 44a formed in boss portions 44 of the pump unit 40 and fastening the self-tapping screws 160 to pilot holes 84 formed in a pilot-hole component 81 (see FIGS. 4 and 5 described below) embedded in the molded stator 50.

Figure 3:
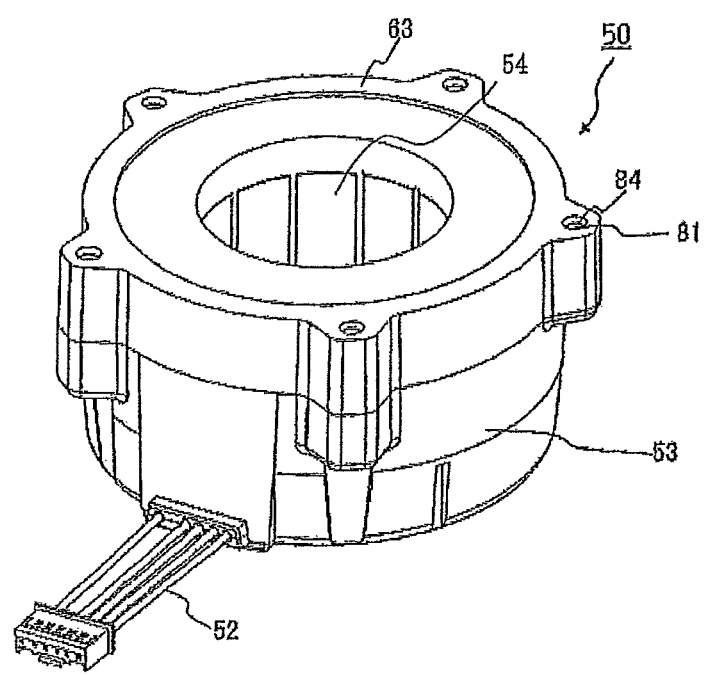
FIG. 3 is a perspective view of a molded stator of the pump according to Embodiment of the present invention.

First, the structure of the molded stator 50 will be described. FIG. 3 is a perspective view of the molded stator 50, FIG. 4 is a sectional view of the molded stator 50, and FIG. 5 is an exploded perspective view of a stator assembly 49.

Figure 5:
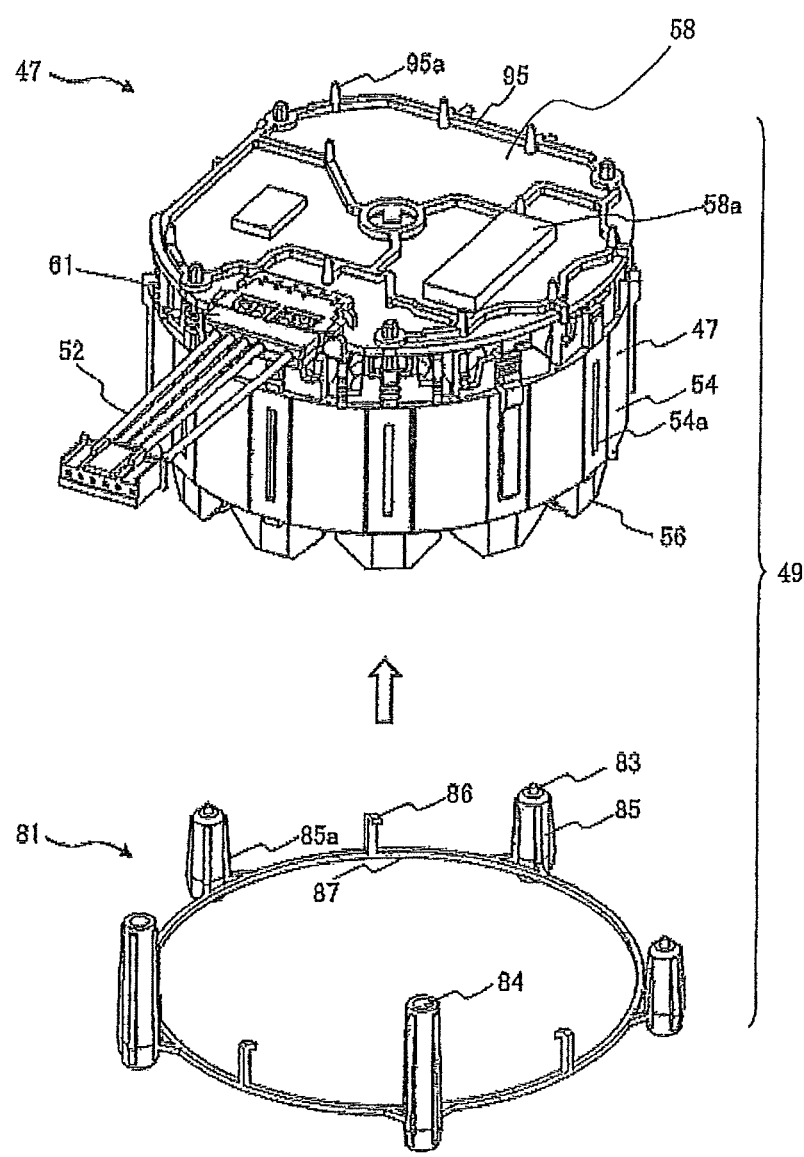
FIG. 5 is an exploded perspective view of a stator assembly of the pump according to Embodiment of the present invention.

As illustrated in FIGS. 3 to 5, the molded stator 50 is formed by molding the stator assembly 49 (described below) with molding resin 53.

One end surface of the molded stator 50 in an axial direction (pump-unit-40-side end surface (an end surface in a side on which the pump unit 40 is provided; for ease of understanding, similar hyphenated appositive nouns serving as locative adjectives may appear throughout the descriptions; in some cases they may have reference numerals embedded therein as in this phrase; they are merely for improving legibility in this translation avoiding unnecessary complexity.)) is a flat pump-unit receiving surface 63 that extends along an outer peripheral edge portion.

Leg portions 85 (see FIG. 5), which are substantially columnar resin molded parts, of the pilot-hole component 81 are embedded in the molding resin 53 so as to extend in the axial direction at five corners around the axis of the molding resin 53. In the state in which the pilot-hole component 81 is molded with resin, the pilot holes 84 open in the pump-unit receiving surface 63. In the molding process using the molding resin 53, one end surface (pump-unit-40-side end surface) of each leg portion 85 of the pilot-hole component 81 serves as a mold pressing portion 82 (see FIG. 4) for a mold. Therefore, the end surfaces of the pilot-hole component 81 embedded in the molding resin are partially exposed at a predetermined depth from the pump-unit receiving surface 63 in the axial direction. The mold pressing portions 82 and the pilot holes 84 for the self-tapping screws 160 are exposed.

A lead wire 52 extending from the stator assembly 49, which will be described below, extends to the outside from a position near the end surface of the molded stator 50 at the side opposite to the pump-unit-40 side in the axial direction.

Positioning of the molded stator 50 in the axial direction in the molding process using the molding resin 53 (thermosetting resin) is achieved by causing outer end surfaces of a plurality of projections 95a on a board pressing member 95 (see FIG. 5) in the axial direction to serve as mold pressing portions for an upper mold part. Therefore, the outer end surfaces of the projections 95a in the axial direction (mold pressing surfaces) are exposed at the end surface of the molded stator 50 at a board-58 side in the axial direction.

In addition, end surfaces of insulating portions 56 at a side opposite to a connection side (at the pump-unit-40 side) serve as mold pressing portions for a lower mold part. Therefore, the end surfaces of the insulating portions 56 at the side opposite to the connection side are exposed at the end surface of the molded stator 50 at a side opposite to the board-58 side in the axial direction (not shown).

Positioning of the molded stator 50 in the radial direction in the molding process is achieved by fitting an inner peripheral surface of a stator core 54 to the mold. Therefore, end portions (inner peripheral portions) of teeth of the stator core 54 of the stator assembly 49 are exposed at the inner periphery of the molded stator 50 illustrated in FIG. 3.

The inner structure of the molded stator 50, that is, the stator assembly 49 (the lead wire 52, the stator core 54, the insulating portions 56, coils 57, the board 58, terminals 59, etc., illustrated in FIG. 4) and the pilot-hole component 81, will be described below.

Next, the stator assembly 49 will be described. As illustrated in FIG. 5, the stator assembly 49 includes a stator 47 and the pilot-hole component 81.

The stator assembly 49 is manufactured by the following procedure.

(1) Strip-shaped electromagnetic steel sheets are punched out of an electromagnetic steel sheet having a thickness of about 0.1 to 0.7 mm, and are stacked together by caulking, welding, bonding, etc., to form the strip-shaped stator core 54. The strip-shaped stator core 54 includes a plurality of teeth. The end portions of the teeth of the stator core 54 are exposed at the inner periphery of the molded stator 50 illustrated in FIG. 3. The stator core 54 includes twelve teeth that are connected to each other with thin connecting portions. Therefore, in FIG. 3, the end portions of the teeth of the stator core 54 are exposed at twelve positions. However, only five of the twelve teeth are visible in FIG. 3.

(2) The insulating portions 56 are formed on the teeth of the stator core 54. The insulating portions 56 are formed integrally with or separately from the stator core 54 by using a thermoplastic resin, such as polybutylene terephthalate (PBT).

(3) The coils 57, which are concentrated winding coils, are wound around the teeth on which the insulating portions 56 are formed. Twelve concentrated winding coils 57 are connected to form three-phase, single Y-connected windings.

(4) Since the three-phase, single Y-connected windings are formed, the terminals 59 (see FIG. 4, power supply terminals to which power is supplied and a neutral terminal), to which the coils 57 of each phase (U-phase, V-phase, and W-phase) are connected, are provided at the connection side of the insulating portions 56. Three power supply terminals and a single neutral terminal are provided.

(5) The board 58 is attached to the insulating portions 56 at the connection side (side at which the terminals 59 are attached). The board 58 is clamped between the board pressing member 95 and the insulating portions 56. An IC 58*a* (drive element) that drives an electric motor (brushless DC motor), a Hall element 58*b* (see FIG. 4, position detection element) that detects the position of a rotor 60, etc., are mounted on the board 58. Although the IC 58*a* is visible in FIG. 5 because it is mounted on the board 58 at the board-pressing-member-95 side, the Hall element 58*b* is not visible in FIG. 5 because it is mounted at the side opposite to the side at which the IC 58*a* is mounted. The IC 58*a* and the Hall element 58*b* are defined as electronic components. A lead-wire guide part 61, which guides the lead wire 52, is attached to a cut portion of the board 58 at a position near the outer peripheral edge of the board 58.

(6) The board 58 to which the lead-wire guide part 61 is attached is fixed to the insulating portions 56 with the board pressing member 95, and the terminals 59 are soldered onto the board 58, so that the stator 47 is formed. The stator assembly 49 is completed by assembling the pilot-hole component 81 to the stator 47.

The structure of the pilot-hole component 81 will now be described in detail with reference to FIG. 5. The pilot-hole component 81 is molded from a thermoplastic resin, such as polybutylene terephthalate (PBT).

As illustrated in FIG. 5, the pilot-hole component 81 includes the plurality of substantially columnar leg portions 85 that are connected to each other with a thin connecting portion 87. The leg portions 85 have the pilot holes 84 to which the self-tapping screws 160 (see FIG. 2) are fastened to assemble the pump unit 40, and projections 83 to which a mold contacts in the molding process. In the example illustrated in FIG. 5, the pilot-hole component 81 includes five leg portions 85. To prevent the pilot-hole component 81 from being extracted after being molded together with the stator 47, the substantially columnar leg portions 85 are tapered such that the thickness thereof increases from the exposed end surfaces (the mold pressing portions 82 and end portions of the projections 83) toward the central regions of the leg portions 85.

In addition, the pilot-hole component 81 has a plurality of projections 85*a* for preventing rotation of the pilot-hole component 81 on the outer periphery of each leg portion 85 (for example, four projections 85*a* are provided on each leg portion 85). The projections 85*a* have a certain width in the circumferential direction and a height that is somewhat smaller than that of the leg portions 85 in the height direction of the leg portions 85. The projections 85*a* project from the outer peripheries of the leg portions 85 in the radial direction by an amount required to prevent rotation of the pilot-hole component 81. The substantially columnar leg portions 85 of the pilot-hole component 81 are connected to each other with the thin connecting portion 87, and therefore can be set to a mold at the same time. Thus, the processing cost can be reduced.

A plurality of lugs 86 for attaching the pilot-hole component 81 to the stator 47 are provided on the connecting portion 87 of the pilot-hole component 81, and the lugs 86 of the pilot-hole component 81 are engaged with grooves 54*a* formed in an outer peripheral portion of the stator core 54 of the stator 47. Accordingly, the stator 47 and the pilot-hole component 81 can be set to the mold at the same time, and the processing cost can be reduced.

When the stator assembly 49, in which the pilot-hole component 81 is engaged with the stator 47, is molded with the molding resin 53, the end surfaces of the pilot-hole component 81 at the side at which the pilot holes 84 for the self-tapping screws 160 open (mold pressing portions 82) and the projections 83 provided on the end surfaces of the pilot-hole component 81 at the other side are clamped by the mold, so that the pilot-hole component 81 is positioned in the axial direction.

The diameter D2 of the mold pressing portions 82 on the end surfaces of the pilot-hole component 81 at the side at which the pilot holes 84 for the self-tapping screws 160 open is set so as to be smaller than the diameter D1 of the end surfaces of the pilot-hole component 81 at the opening side (see FIG. 4). Accordingly, the end surfaces of the pilot-hole component 81 are covered by the molding resin 53 in regions excluding the mold pressing portions 82. Consequently, the end surfaces of the pilot-hole component 81 at both sides thereof are covered by the molding resin 53, so that the area in which the pilot-hole component 81 is exposed can be reduced and the quality of the pump 10 can be improved.

The molded stator 50 is formed by molding the stator 47 and the pilot-hole component 81 attached thereto together integrally with the molding resin 53, and the pilot holes 84 for the self-tapping screws 160 in the leg portions 85 of the pilot-hole component 81 are exposed in this state. The pump unit 40 and the molded stator 50 are assembled together by inserting the self-tapping screws 160 through the screw holes 44*a* formed in the pump unit 40 and fastening the self-tapping screws 160 to the pilot holes 84. In this way, the pump unit 40 and the molded stator 50 can be securely assembled together (see FIG. 2).

Figure 6:
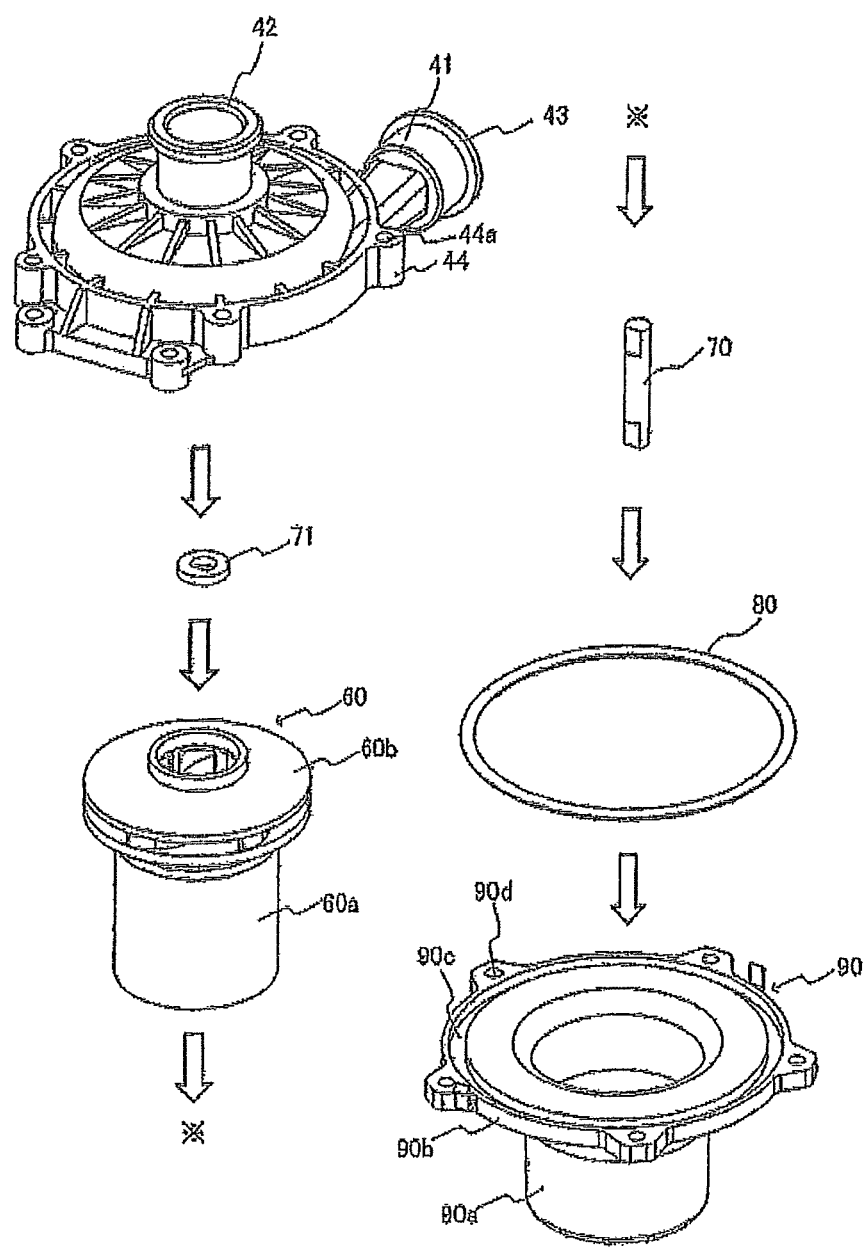
FIG. 6 is an exploded perspective view of a pump unit of the pump according to Embodiment of the present invention.
Figure 7:
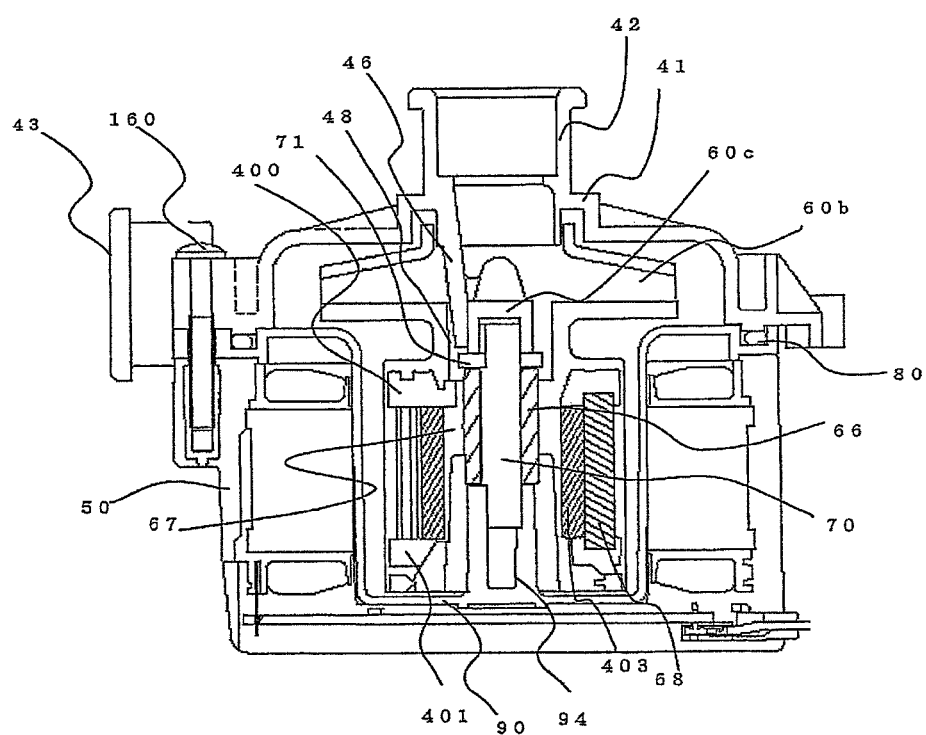
FIG. 7 is a sectional view of the pump according to Embodiment of the present invention.
Figure 8:
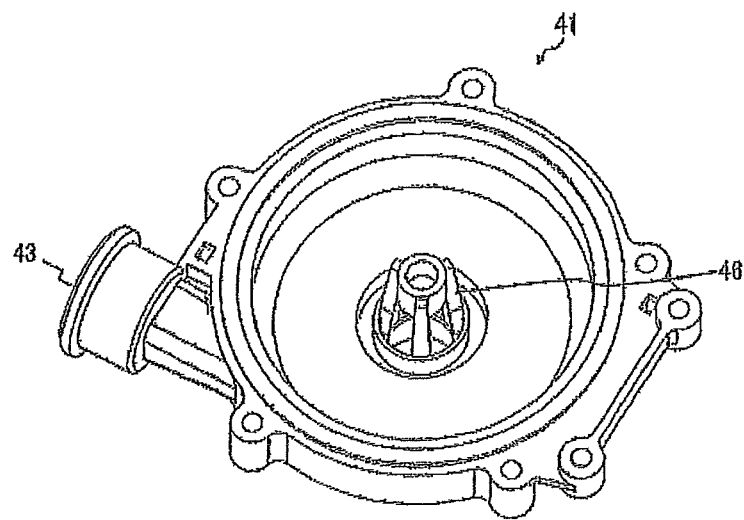
FIG. 8 is a perspective view of a casing of the pump according to Embodiment of the present invention viewed from a shaft-support-portion side.

The structure of the pump unit 40 will now be described. FIG. 6 is an exploded perspective view of the pump unit 40, FIG. 7 is a sectional view of the pump 10, and FIG. 8 is a perspective view of a casing 41 viewed from a shaft-support-portion-46 side.

As illustrated in FIG. 6, the pump unit 40 includes the following components.

(1) Casing 41

The casing 41 has a fluid inlet 42 and a fluid outlet 43, and contains an impeller 60*b* of the rotor 60 therein. The casing 41 is molded from a thermoplastic resin, such as polyphenylene sulfide (PPS). The casing 41 includes five boss portions 44 on an end portion thereof at the fluid-inlet-42 side, the boss portions 44 having the screw holes 44*a* used to assemble the pump unit 40 and the molded stator 50 together.

(2) Thrust Bearing 71

A thrust bearing 71 is formed of a ceramic, such as alumina. During the operation of the pump 10, the rotor 60 is pressed against the casing 41 with the thrust bearing 71 interposed therebetween owing to a difference between pressures applied to front and back sides of the impeller 60*b* of the rotor 60. Therefore, the thrust bearing 71 is formed of a ceramic to ensure sufficient wear resistance and sliding performance.

(3) Rotor 60

The rotor 60 includes a rotor portion 60*a* and the impeller 60*b*. The rotor portion 60*a* includes a ring-shaped (cylindrical) magnet assembly 68 (example of a magnet) molded from pellets formed by kneading powder of a magnetic material, such as ferrite, and resin, and a cylindrical sleeve bearing 66 (formed of, for example, carbon) disposed inside the magnet assembly 68. The magnet assembly 68 and the sleeve bearing 66 are integrated together with a resin portion 67 formed of, for example, polyphenylene ether (PPE) (see FIG. 7). The impeller 60b is molded from a resin, such as polyphenylene ether (PPE). The rotor portion 60a and the impeller 60b are bonded together by, for example, ultrasonic welding. The rotor 60 will be described in detail below with reference to FIGS. 16 to 18.

(4) Shaft 70

A shaft 70 is formed of, for example, a ceramic, such as alumina, or SUS. Since the shaft 70 slides with respect to the sleeve bearing 66 of the rotor 60, a material such as a ceramic or SUS is selected to ensure sufficient wear resistance and sliding performance. One end of the shaft 70 is inserted into a shaft support portion 94 of the cup-shaped partition wall component 90, and the other end of the shaft 70 is inserted into a shaft support portion 46 of the casing 41. The one end of the shaft 70 is inserted into the shaft support portion 94 of the cup-shaped partition wall component 90 so that the shaft 70 does not rotate relative to the shaft support portion 94. For this purpose, the one end of the shaft 70 is formed in a D-shape by partially cutting a circular shape thereof over a certain length (in the axial direction), and the shaft support portion 94 of the cup-shaped partition wall component 90 has a hole having a shape corresponding to the shape of the shaft. The other end of the shaft 70 that is inserted into the shaft support portion 46 of the casing 41 is also formed in a D-shape by partially cutting a circular shape thereof over a certain length (in the axial direction). Thus, the shaft 70 is symmetric about the center in the longitudinal direction. The other end of the shaft 70 is rotatably inserted into the shaft support portion 46 of the casing 41. The shaft 70 is formed so as to be symmetric about the center in the longitudinal direction so that it is possible to insert the shaft 70 into the shaft support portion 94 of the cup-shaped partition wall component 90 without controlling the orientation of the shaft 70 in the vertical direction.

(5) O-ring 80

An O-ring 80 is formed of, for example, ethylene-propylene-diene rubber (EPDM). Ethylene-propylene-diene rubber is obtained by introducing a small amount of third component into ethylene-propylene rubber (EPM), which is a copolymer of ethylene and propylene, to form a double bond in the main chain. Various types of synthetic rubbers having different types and amounts of third component are commercially available. Typical examples of the third component include ethylidene norbornene (ENB), 1,4-hexadiene (1,4-HD), and dicyclopentadiene (DCP). The O-ring 80 is clamped between the casing 41 of the pump unit 40 and the cup-shaped partition wall component 90, and seals a gap between the casing 41 and the cup-shaped partition wall component 90. In the pump 10 installed in a hot-water supplying apparatus or the like, seals used in wet areas are required to have a high heat resistance and long life. Therefore, a material such as EPDM is used to ensure sufficient heat resistance (6) Cup-Shaped Partition Wall Component 90

The cup-shaped partition wall component 90 is formed of a thermoplastic resin, such as polyphenylene ether (PPE). The cup-shaped partition wall component 90 includes the cup-shaped partition wall portion 90a, which is fitted to the molded stator 50, and a flange portion 90b. The cup-shaped partition wall portion 90a includes a circular bottom portion and a cylindrical partition wall. The shaft support portion 94, into which the one end of the shaft 70 is inserted, stands on the inner surface of the circular bottom portion in a substantially central region thereof. A plurality of reinforcing ribs (not shown) (for example, ten reinforcing ribs) for reinforcing the flange portion 90b are formed on the flange portion 90b so as to extend in the radial direction. In addition, an annular rib (not shown) to be fitted to the pump-unit receiving surface 63 of the molded stator 50, the pump-unit receiving surface 63 receiving the pump unit 40, is also formed on the flange portion 90b. The flange portion 90b has five holes 90d through which the self-tapping screws 160 are inserted. The flange portion 90b also has an annular O-ring receiving groove 90c for receiving the O-ring 80 in a casing-41-side surface thereof.

The pump 10 is assembled by placing the O-ring 80 on the cup-shaped partition wall component 90, assembling the pump unit 40 by attaching the casing 41 to the cup-shaped partition wall component 90, and fixing the pump unit 40 to the molded stator 50 with the self-tapping screws 160 or the like.

Ribs 92 provided on the bottom portion of the cup-shaped partition wall component 90 are fitted to grooves (not shown) formed in the molded stator 50, so that the pump unit 40 and the molded stator 50 are positioned relative to each other in the circumferential direction.

The rotor 60 is disposed inside the inner periphery of the cup-shaped partition wall portion 90a of the cup-shaped partition wall component 90 such that the rotor 60 is fitted to the shaft 70 that is inserted in the shaft support portion 94 of the cup-shaped partition wall component 90. To allow the molded stator 50 and the rotor 60 to be arranged coaxially, a gap between the inner periphery of the molded stator 50 and the outer periphery of the cup-shaped partition wall portion 90a of the cup-shaped partition wall component 90 are preferably as small as possible. The gap is set to, for example, about 0.02 to 0.06 mm.

If the gap between the inner periphery of the molded stator 50 and the outer periphery of the cup-shaped partition wall portion 90a of the cup-shaped partition wall component 90 is reduced, the space for allowing air to escape when the cup-shaped partition wall portion 90a of the cup-shaped partition wall component 90 is inserted into the space inside the inner periphery of the molded stator 50 is reduced. As a result, it becomes difficult to insert the cup-shaped partition wall component 90. To avoid this, a groove (not shown) for allowing air to escape that extends in the axial direction may be formed in an inner peripheral portion of the molded stator 50. In the case where the groove is not formed, the gap may be formed so as to be as large as 0.02 to 0.06 mm.

Figure 9:
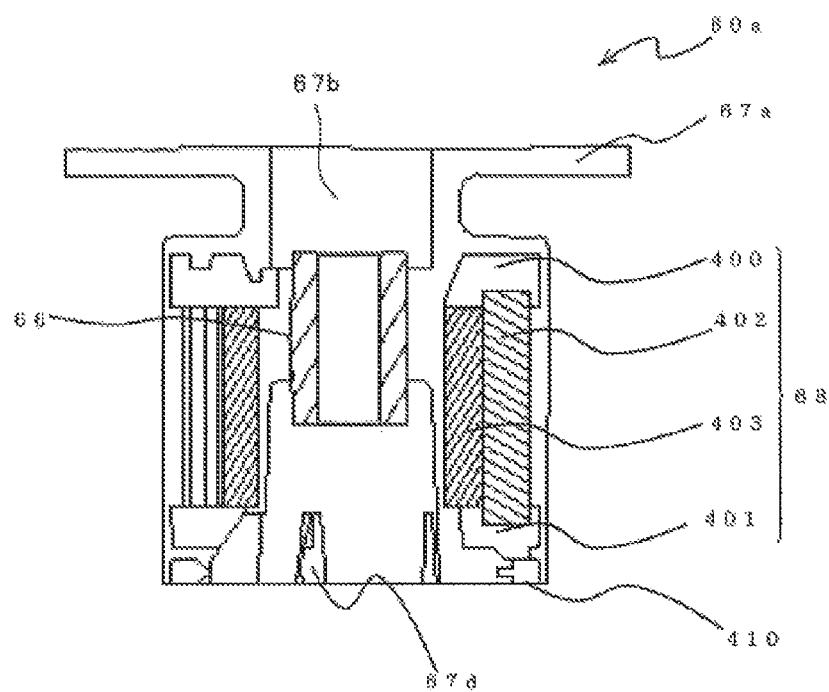
FIG. 9 is a sectional view of a rotor portion of the pump according to Embodiment of the present invention.
Figure 10:
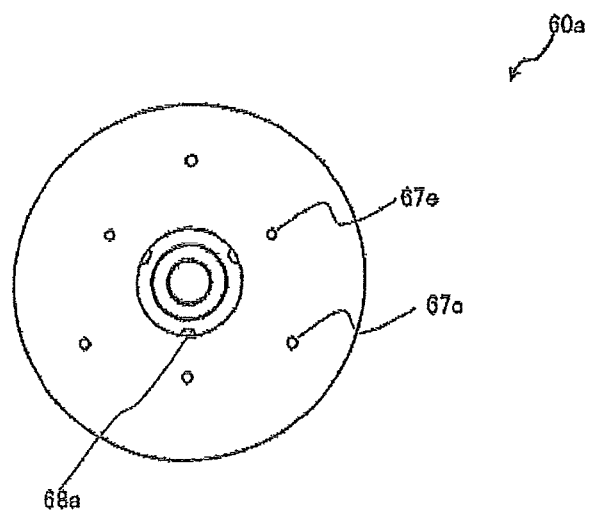
FIG. 10 is a side view of the rotor portion of the pump according to Embodiment of the present invention viewed from an impeller-attachment-portion side (a side on which an impeller-attachment portion is provided).
Figure 11:
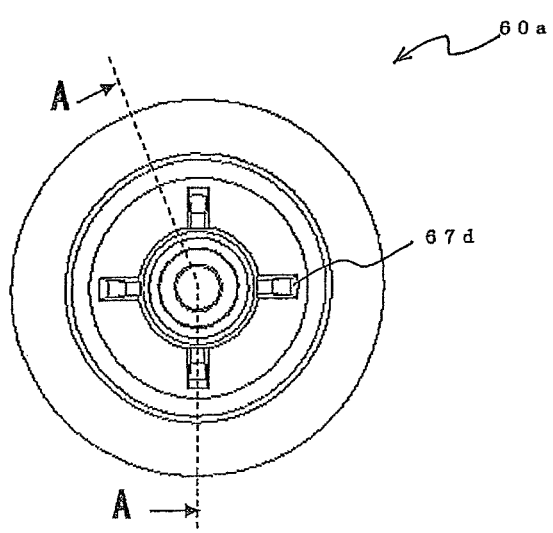
FIG. 11 is a side view of the rotor portion of the pump according to Embodiment of the present invention viewed from a side opposite to the impeller-attachment-portion side.
Figure 12:
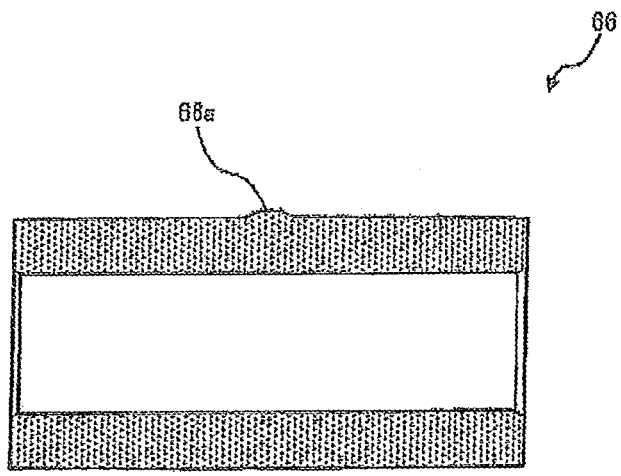
FIG. 12 is an enlarged sectional view of a sleeve bearing of the pump according to Embodiment of the present invention.

FIG. 9 is a sectional view of the rotor portion 60a (sectional view of FIG. 11 taken along line A-A), FIG. 10 is a side view of the rotor portion 60a viewed from an impeller-attachment-portion-67a side, FIG. 11 is a side view of the rotor portion 60a viewed from a side opposite to the impeller-attachment-portion-67a side, and FIG. 12 is an enlarged sectional view of the sleeve bearing 66. The rotor portion 60a will now be described with reference to FIGS. 9 to 12.

As illustrated in FIGS. 9 to 12, the rotor portion 60a includes at least the following elements. The magnet assembly 68 and the sleeve bearing 66 are molded together integrally with a thermoplastic resin (resin portion 67) such as polyphenylene ether (PPE).

(1) Magnet Assembly 68 and Position Detection Magnet 410

The magnet assembly 68 includes a plurality of tile-shaped sintered magnets 402, a substantially ring-shaped back yoke 403, and a first magnet holder 400 and a second magnet holder 401 that are formed of a thermoplastic resin.

A thin, substantially ring-shaped position detection magnet 410 is provided on the second magnet holder 401 of the magnet assembly 68. The magnet assembly 68 and the position detection magnet 410 will be described in detail below with reference to FIGS. 13 to 18.

(2) Sleeve Bearing 66

The sleeve bearing 66 (formed of, for example, carbon) is disposed inside the magnet assembly 68. The sleeve bearing 66 has a cylindrical shape. The sleeve bearing 66 is rotated while being fitted to the shaft 70, which is attached to the cup-shaped partition wall component 90 of the pump 10. Therefore, the sleeve bearing 66 is formed of a material suitable for a bearing, such as a sintered carbon, a thermoplastic resin, such as polyphenylene sulfide (PPS), to which carbon fibers are added, or a ceramic. The sleeve bearing 66 has a hollow-tapered shape such that the outer diameter thereof decreases from a region around the axial center toward both ends thereof with a hollow, and is provided with a plurality of semi-spherical projections 66a (see FIG. 12) on the outer periphery thereof in the region around the axial center, the projections 66a serving as rotation stoppers.

(3) Resin Portion 67 (Impeller Attachment Portion 67a to which the Impeller 60b is Attached is Formed Integrally with the Resin Portion 67 Made of the Thermoplastic Resin)

A portion of the resin portion 67, the portion being formed on an impeller-attachment-portion-67a-side end surface (an end surface in a side on which the impeller attachment portion 67a is provided) of the magnet assembly 68, has a first recess 67b at a position corresponding to a magnet pressing portion provided on an upper part of a mold used in resin molding. In the example illustrated in FIG. 13, the first recess 67b is formed substantially in a central region (in the radial direction). The first recess 67b is located so as to oppose projections 68a of the magnet assembly 68.

As illustrated in FIG. 10, impeller positioning holes 67c used to attach the impeller 60b are formed in an impeller attachment portion 67a with substantially constant intervals therebetween in the circumferential direction. The number of impeller positioning holes 67c is, for example, three. The impeller positioning holes 67c extend through the impeller attachment portion 67a. Each of the impeller positioning holes 67c is formed on a radial line that extends through the middle position between two of the three projections 68a of the magnet assembly 68 (three projections 68a are illustrated in FIG. 10).

In addition, as illustrated in FIG. 10, gates 67e used when the rotor portion 60a is molded with the thermoplastic resin (resin portion 67) are formed on the impeller attachment portion 67a with substantially constant intervals therebetween in the circumferential direction. The number of gates is, for example, three. The gates 67e are formed on radial lines that pass through three projections 68a of the magnet assembly 68, and are located further toward the inside than the impeller positioning holes 67c.

Cuts 67d, which are fitted to positioning projections (not shown) provided on a lower part of the mold used in resin molding, are formed in a portion of the resin portion 67, the portion formed on an inner peripheral surface of the magnet assembly 68 at a side opposite to the impeller-attachment-portion-67a side (see FIGS. 9 and 11). In the example illustrated in FIG. 10, the cuts 67d are formed at four positions that are apart from each other by approximately 90°. The positions of the cuts 67d correspond to the positions of cuts 68b in the magnet assembly 68 (described below, FIG. 15).

Figure 13:
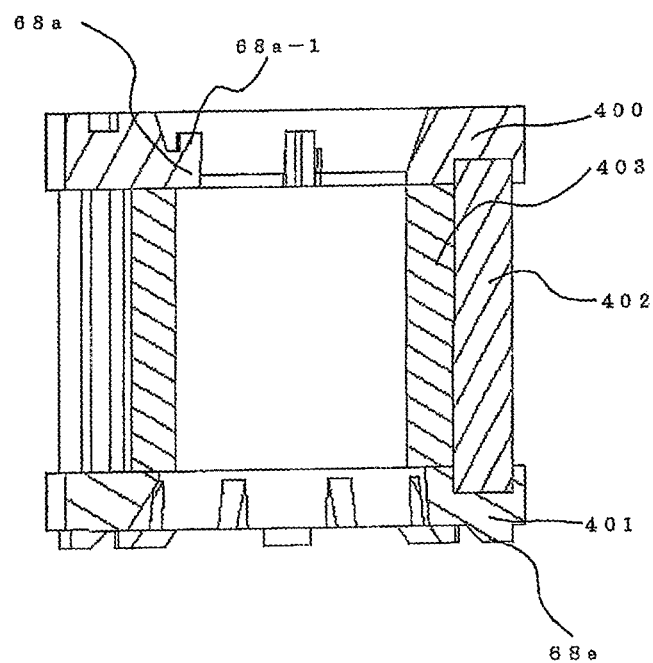
FIG. 13 is a sectional view of a magnet assembly of the pump according to Embodiment of the present invention.
Figure 14:
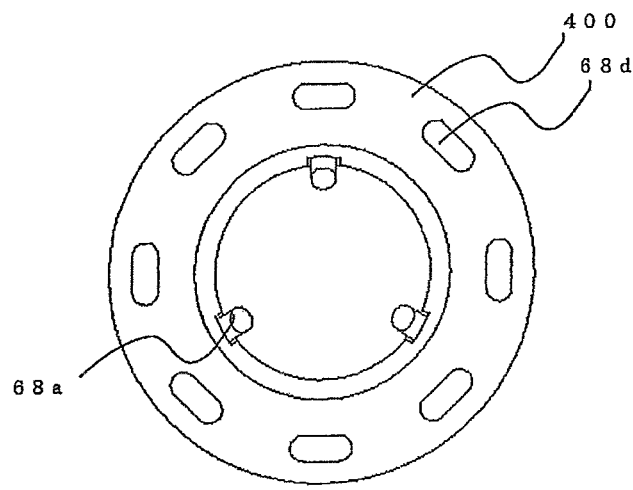
FIG. 14 is a side view of the magnet assembly of the pump according to Embodiment of the present invention viewed from a projection side.
Figure 15:
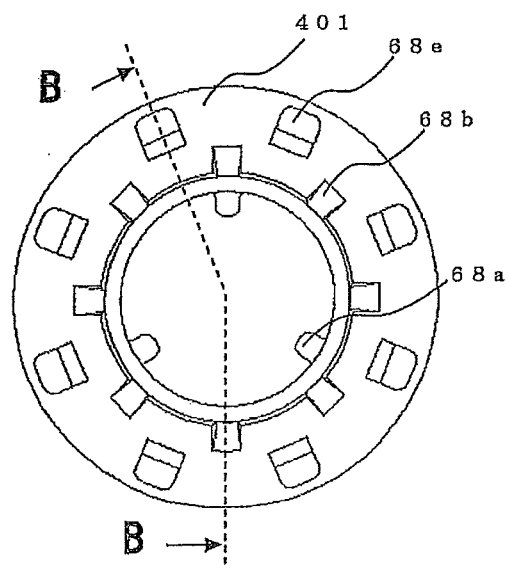
FIG. 15 is a side view of the magnet assembly of the pump according to Embodiment of the present invention viewed from a side opposite to the projection side.
Figure 16:
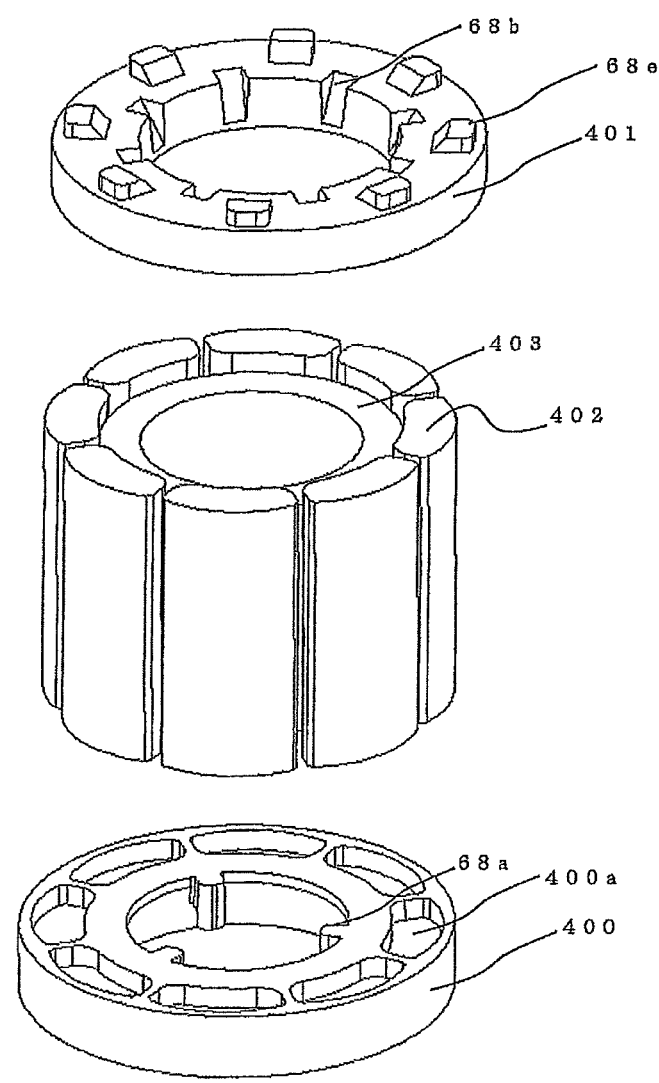
FIG. 16 is an exploded perspective view of the magnet assembly according to Embodiment of the present invention
Figure 17:
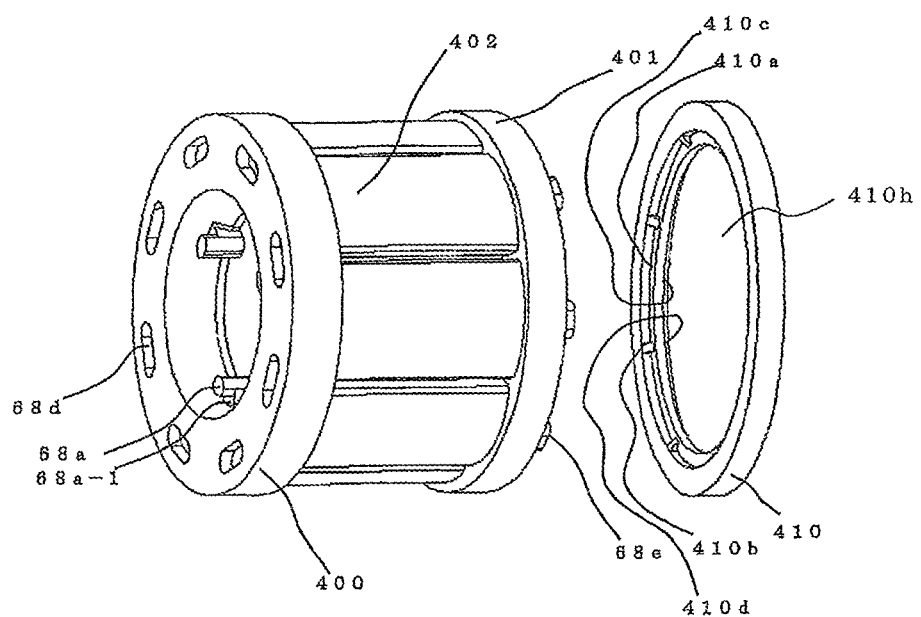
FIG. 17 is an exploded perspective view of the magnet assembly illustrated in FIG. 16 viewed from a first-magnet-holder side.
Figure 18:
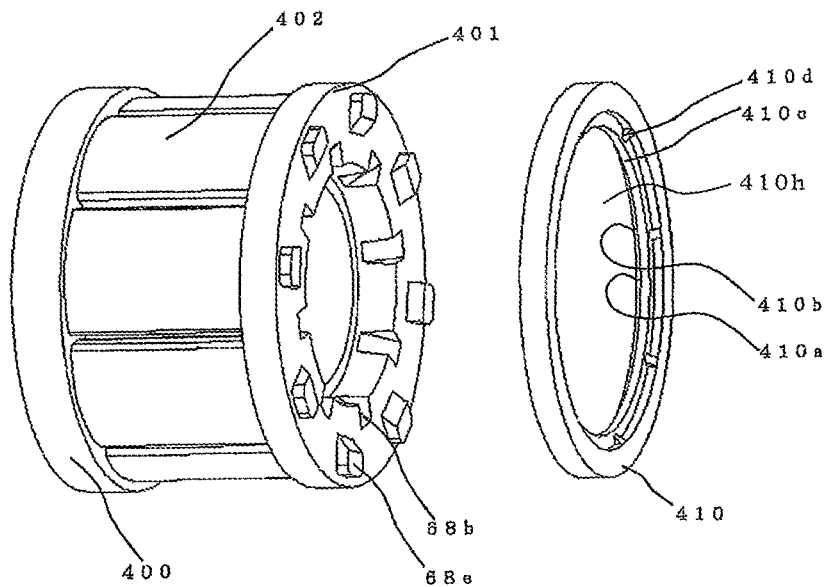
FIG. 18 is an exploded perspective view of the magnet assembly illustrated in FIG. 16 viewed from a position-detection-magnet side (a side on which a position detection magnet is provided).

FIG. 13 is a sectional view of the magnet assembly (sectional view of FIG. 15 taken along line B-B), FIG. 14 is a side view of the magnet assembly 68 viewed from a projection-68a side, FIG. 15 is a side view of the magnet assembly 68 viewed from a side opposite to the projection-68a side, FIG. 16 is an exploded perspective view of the magnet assembly 68, FIG. 17 is an exploded perspective view of the magnet assembly 68 illustrated in FIG. 16 viewed from a first-magnet-holder-400 side, and FIG. 18 is an exploded perspective view of the magnet assembly 68 illustrated in FIG. 16 viewed from a position-detection-magnet-410 side. The magnet assembly 68 will be described in detail with reference to FIGS. 13 to 18.

The magnet assembly 68 is manufactured by attaching the plurality of substantially tile-shaped sintered magnets 402 and the substantially ring-shaped back yoke 403 to the first magnet holder 400 and the second magnet holder 401, which are formed of a thermoplastic resin, such as polybutylene terephthalate (PBT). The thin, substantially ring-shaped position detection magnet 410 is provided on the second magnet holder 401 of the magnet assembly 68.

(1) Sintered Magnets 402

The sintered magnets 402 are magnets manufactured by, for example, grinding a magnetic alloy into fine powder, press-forming the powder while the easy magnetization axis is aligned in a magnetic field, and baking it at a high temperature. The sintered magnets 402 are formed so as to extend from the first magnet holder 400 to the second magnet holder 401, and are substantially tile-shaped. FIGS. 16 to 18 illustrate an example in which the magnet assembly 68 includes eight sintered magnets 402. However, the number of sintered magnets 402 is not limited to this as long as more than one sintered magnets 402 are provided.

Each sintered magnet 402 is arranged so that one end thereof is in contact with the first magnet holder 400, the other end thereof is in contact with the second magnet holder 401, and the inner side surface thereof opposes the back yoke 403. In other words, the sintered magnets 402 are held by the first magnet holder 400 and the second magnet holder 401 in such a manner that the inner side surfaces thereof oppose the back yoke 403.

(2) Back Yoke 403

The back yoke 403 is arranged so that the outer side surface thereof opposes the inner side surfaces of the sintered magnets 402. The back yoke 403 is substantially ring-shaped. The back yoke 403 is formed by, for example, punching out electromagnetic steel sheets and stacking them together by, for example, caulking, welding, or bonding.

(3) First Magnet Holder 400

The first magnet holder 400 holds one end of each sintered magnet 402. The first magnet holder 400 has a circular opening in a central region thereof, and is substantially ring-shaped. A plurality of projections 68a having a substantially angular shape (or arc shape) are formed on an inner peripheral surface of the opening in the first magnet holder 400 with substantially constant intervals therebetween in the circumferential direction. In FIGS. 14 to 16, three projections 68a are formed.

The projections 68a have a substantially angular shape in side view and have protruding portions 68a-1 at the end-surface side. When the rotor portion 60a is formed integrally by the molding process, the protruding portions 68a-1 at the ends of the projections 68a are held by the thermoplastic resin (resin portion 67) of the rotor portion 60a. Thus, even when a small gap is formed between the resin portion 67 and the magnet assembly 68 due to shrinkage of the resin, the rotational torque of the magnet assembly 68 can be reliably transmitted. As a result, the quality of the rotor portion 60a can be improved. The shape of the projections 68a is not limited to the substantially angular shape, and may be, for example, a triangular shape, a trapezoidal shape, a semicircular shape, or a polygonal shape.

As illustrated in FIGS. 14 and 17, a plurality of recesses 68d (eight recesses 68d in the example illustrated in FIGS. 14 and 17) that are substantially elongated-hole-shaped in cross section are formed so as to be radially arranged in the impeller-attachment-portion-67a-side surface of the first magnet holder 400. When the rotor portion 60a is formed integrally by the molding process using the thermoplastic resin (resin portion 67), the recesses 68d are embedded in the thermoplastic resin (resin portion 67), and the magnet assembly 68 is held by the resin portion 67.

As illustrated in FIG. 16, a plurality of recesses 400a (eight recesses 400a in the example illustrated in FIG. 16) that are substantially elongated-hole-shaped in cross section are formed so as to be radially arranged in a surface of the first magnet holder 400 at the side opposite to the impeller-attachment-portion-67a-side. One end of each sintered magnet 402 is inserted into the corresponding recess 400a. Thus, the sintered magnets 402 can be held by the first magnet holder 400.

(4) Second Magnet Holder 401

The second magnet holder 401 holds the other end of each sintered magnets 402. The second magnet holder 401 has a circular opening in a central region of the second magnet holder 401, and is substantially ring-shaped.

Tapered cuts 68b are formed in the inner peripheral surface of the opening in the second magnet holder 401 with substantially constant intervals therebetween in the circumferential direction. In FIGS. 15, 16, and 18, the number of cuts 68b is eight. The cuts 68b are tapered such that the width thereof increases toward the near side in FIG. 15. In other words, the cuts 68b are tapered such that the width thereof at the end-surface side is greater than that at the inner side.

A plurality of projecting portions 68e, on which the position detection magnet 410 is placed, are formed on a surface of the second magnet holder 401 at a side at which the sintered magnets 402 are not provided. In FIGS. 15, 16, and 18, the number of projecting portions 68e is eight. When the rotor portion 60a is formed integrally by the molding process using the thermoplastic resin (resin portion 67), the projecting portions 68e are embedded in the thermoplastic resin (resin portion 67), and the magnet assembly 68 is held by the resin portion 67.

Although not illustrated, a plurality of recesses that are substantially elongated-hole-shaped in cross section are formed so as to be radially arranged in a surface of the second magnet holder 401 that opposes the sintered magnets 402. In other words, similar to the first magnet holder 400 in which eight recesses 400a are formed, the second magnet holder 401 also has eight recesses formed therein. The other end of each sintered magnet 402 is inserted into the corresponding recess in the second magnet holder 401. Thus, the sintered magnets 402 can be held by the second magnet holder 401.

(5) Position Detection Magnet 410

As illustrated in FIG. 17, the position detection magnet 410 is a thin, substantially ring-shaped magnet having an opening 410h. The position detection magnet 410 is formed of, for example, a resin. The main magnetic flux of the position detection magnet 410 is detected by a Hall IC which is surface-mounted on the board 58 and in which the Hall element 58b, which is a magnetic sensor, and an IC for converting an output signal of the Hall element 58b into a digital signal are formed in a single package.

More specifically, the position detection magnet 410 is formed so that the main magnetic flux thereof is formed on an end surface of the position detection magnet 410 in the axial direction (end surface opposing the magnetic-pole-position detection element), and the position of the rotor portion 60a can be detected by detecting the main magnetic flux with the Hall element 58b.

The position detection magnet 410 is substantially ring-shaped, and is located so as to oppose the Hall element 58b. Therefore, the Hall element 58b can easily detect the main magnetic flux of the position detection magnet 410. Accordingly, compared to the case in which the Hall element 58b is fixed to the board 58 with a Hall element holder (not shown) and the main magnetic flux of the magnet assembly 68 is detected at a side surface of the magnet assembly 68, the position detection accuracy can be increased and the quality of the pump can be improved.

In addition, since the Hall element holder is not necessary, the processing cost of the board 58 can be reduced, and the cost of the pump 10 can be reduced accordingly.

As illustrated in FIG. 17, a step 410a is formed on a surface of the position detection magnet 410, the surface opposing the projecting portions 68e. A plurality of ribs 410b are formed on the step 410a with substantially constant intervals therebetween in the circumferential direction, the ribs 410b preventing the position detection magnet 410 from rotating when the position detection magnet 410 is provided on the second magnet holder 401.

As illustrated in FIG. 18, a step 410c is formed on a surface of the position detection magnet 410 at a side opposite to the side at which the projecting portions 68e are formed. A plurality of ribs 410d, which serve as rotation stoppers, are also formed on the step 410c with substantially constant intervals therebetween in the circumferential direction.

Since the steps 410a and 410c and the ribs 410b and 410d are formed on the position detection magnet 410, the position detection magnet 410 can be attached to the second magnet holder 402 at either side thereof. Therefore, as described below, the process can be simplified and the productivity can be increased. As a result, the manufacturing cost can be reduced.

Next, the molding method for integrally forming the rotor 60 of an electric motor for a pump by using a thermoplastic resin will be described.

The mold with which the magnet assembly 68, the position detection magnet 410, and the sleeve bearing 66 are molded integrally together includes an upper mold part and a lower mold part (not shown). First, the sleeve bearing 66 is set to the lower mold part. Since the sleeve bearing 66 is symmetric about the center in the axially vertical direction, it is not necessary to control the orientation in the vertical direction when setting the sleeve bearing 66 to the mold. Although the sleeve bearing 66 has the projections 66a (see FIG. 12) on the outer peripheral portion thereof, the positions of the projections 66a are not particularly limited. Therefore, the process of integrally molding the magnet assembly 68, the position detection magnet 410, and the sleeve bearing 66 together can be simplified and the productivity can be increased. As a result, the manufacturing cost can be reduced.

When the sleeve bearing 66 is set to the lower mold part, the inner periphery of the sleeve bearing 66 is held by a sleeve-bearing receiving portion provided on the lower mold part, so that the sleeve bearing 66 can be arranged accurately coaxially with the magnet assembly 68, which is set in the subsequent step.

Next, the position detection magnet 410 is set to the lower mold part. Since the second-magnet-holder-402-side surface of the position detection magnet 410 is symmetric with the surface of the position detection magnet 410 at the opposite side, it is not necessary to control the orientation of the position detection magnet 410 when setting the position detection magnet 410 to the mold. In addition, since the ribs 410b and 410d are formed on the steps 410a and 410c of the position detection magnet 410 with substantially constant intervals therebetween in the circumferential direction, it is not necessary to control the orientation in the circumferential direction when setting the second magnet holder 402 to the mold. Therefore, the processes can be simplified and the productivity can be increased. As a result, the manufacturing cost can be reduced.

When the position detection magnet 410 is set to the lower mold part, the inner peripheral surface of the position detection magnet 410 is held by a portion of the lower mold part for receiving the position detection magnet, so that the position detection magnet 410 can be arranged accurately coaxially with each of the sleeve bearing 66 and the magnet assembly 68, which is set in the subsequent step.

After the sleeve bearing 66 and the position detection magnet 410 have been set to the lower mold part, the magnet assembly 68 is set such that the tapered cuts 68b, which are formed at the inner periphery of one end surface of the magnet assembly 68 (end surface at the side opposite to the impeller-attachment-portion-67a side in the rotor 60 of the electric motor for the pump), are fitted to positioning projections provided on the lower mold part. Although eight cuts 68b are provided in the example illustrated in FIG. 15, four of the eight cuts 68b that are apart from each other by approximately 90° are fitted to the positioning projections on the lower mold part. The reason why eight cuts 68b are provided is to facilitate the process of attaching the magnet assembly 68 to the lower mold part.

Then, the magnet pressing portion of the upper mold part is pressed against the projections 68a, which have a substantially angular shape, in the axial direction, the projections 68a being formed at the inner periphery of the other end surface of the magnet assembly 68 (end surface at the impeller-attachment-portion-67a side in the rotor 60 of the electric motor for the pump). Thus, appropriate positional relationship and coaxiality between the sleeve bearing 66 and the magnet assembly 68 are ensured.

In the example illustrated in FIG. 14, three projections 68a in total which have a substantially angular shape (arc shape) are provided at the inner periphery of the magnet assembly 68, and mold attachment surfaces (portions pressed by the mold) of the projections 68a are exposed after the integral molding process. The reason why three projections 68a are provided is to not only ensure sufficient positioning accuracy for the magnet assembly 68 but also ensure sufficient inflow channel for the thermoplastic resin in the integral molding process, thereby mitigating the molding conditions in the integral molding process and increasing the productivity.

Figure 19:
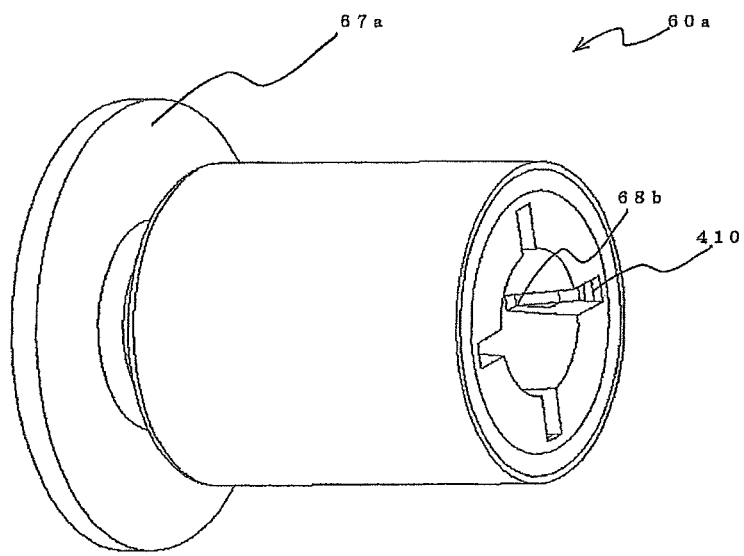
FIG. 19 is a diagram illustrating the state in which the magnet assembly according to Embodiment of the present invention is molded with a resin to form the rotor portion.
Figure 20:
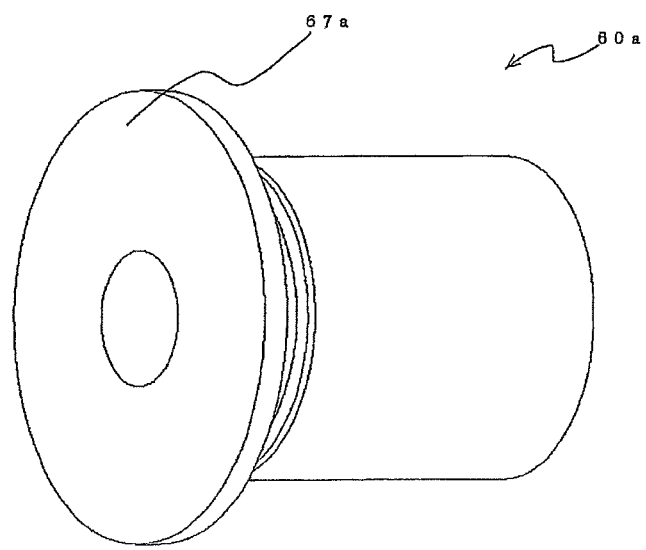
FIG. 20 is a side view of the rotor portion illustrated in FIG. 19 viewed from the position-detection-magnet side.

After the magnet assembly 68, the position detection magnet 410, and the sleeve bearing 66 have been set to the mold, a thermoplastic resin, such as polyphenylene ether (PPE), is injected to form the rotor portion 60a (see FIGS. 19 and 20).

At this time, the cuts 68b in the magnet assembly 68 that are not pressed by the mold (see FIG. 15), that is, four of the cuts 68b, the projecting portions 68e provided on the second magnet holder 401, and the recesses 68d formed in the end surface of the first magnet holder 400 are embedded in the resin portion 67 formed of the thermoplastic resin and serve as rotational-torque transmitting portions. Since the projecting portions 68e and the recesses 68d are embedded in the resin portion 67 formed of the thermoplastic resin, the magnet assembly 68 is securely held.

When the magnet assembly 68 is magnetized after the magnet assembly 68, the position detection magnet 410, and the sleeve bearing 66 have been molded integrally together with the thermoplastic resin (resin portion 67), the cuts 67d (four cuts 67d in FIG. 11) formed at the inner periphery of the end surface of the magnet assembly 68 at the side opposite to the impeller-attachment-portion-67a side in the rotor portion 60a may be used for positioning. In such a case, the magnet assembly 68 can be accurately magnetized.

As described above, Embodiment has the following advantages.

(1) In the pump 10 according to Embodiment 1, the sintered magnets 402 are held by the first magnet holder 400 and the second magnet holder 401 at both ends thereof. Therefore, the outer side surfaces of the sintered magnets 402 are exposed, and the distance between the stator and each sintered magnet 402 can be reduced accordingly. As a result, the performance of the pump 10 can be improved.

(2) Compared to a bonded magnet formed of a material in which plastic is mixed, the sintered magnets 402 have superior magnetic characteristics since no nonmagnetic component, such as a plastic, is contained therein. In addition, the sintered magnets 402 also have a higher heat resistance. Therefore, the performance of the pump 10 can be improved without increasing the size thereof.

Figure 21:
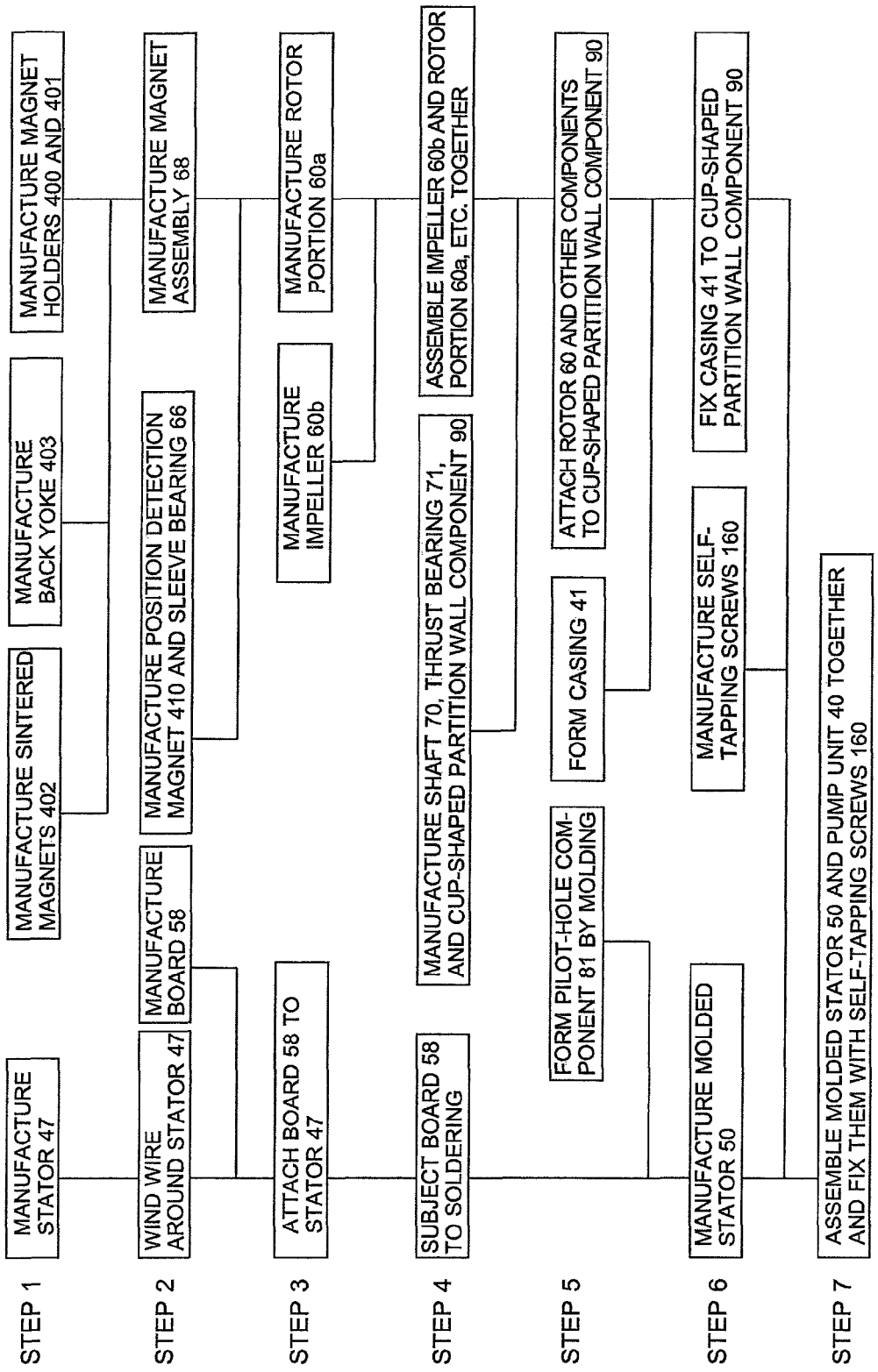
FIG. 21 is a diagram illustrating steps for manufacturing the pump according to Embodiment of the present invention.

FIG. 21 is a diagram illustrating the manufacturing steps of the pump 10. The manufacturing steps of the pump 10 will now be described with reference to FIG. 21. In the following description, "manufacture" may be read as "prepare".

(1) Step 1

The stator core 54 of the stator 47 is manufactured. The stator core 54 is formed in a strip shape by punching strip-shaped electromagnetic steel sheets out of an electromagnetic sheet having a thickness of about 0.1 to 0.7 mm and stacking them together by, for example, caulking, welding, or bonding.

In addition, the sintered magnets 402 are manufactured.

In addition, the substantially ring-shaped back yoke 403 is manufactured by punching out electromagnetic steel sheets and stacking them together.

In addition, the first magnet holder and the second magnet holder 400 are manufactured. The first magnet holder has the recesses 68d that are arranged radially and have a substantially angular shape and the recesses 400a for holding the sintered magnets 402. The second magnet holder has the projecting portions 68e that serve as a base for the position detection magnet 410 and recesses (not shown) for holding the sintered magnets 402.

(2) Step 2

Wires are wound around the stator core 54. The insulating portions 56 made of a thermoplastic resin, such as polybutylene terephthalate (PBT), are formed on the teeth of the strip-shaped stator core 54, the teeth being connected to each other with the thin connecting portions. The concentrated winding coils 57 are wound around the teeth on which the insulating portions 56 are formed. For example, twelve concentrated winding coils 57 are connected to form three-phase, single Y-connected windings. Since the three-phase, single Y-connected windings are formed, the terminals 59 (power supply terminals to which power is supplied and a neutral terminal), to which the coils 57 of each phase (U-phase, V-phase, and W-phase) are connected, are provided at the connection side of the insulating portions 56.

In addition, the board 58 is manufactured. The board 58 is clamped between the board pressing member 95 and the insulating portions 56. The IC that drives the electric motor (brushless DC motor), the Hall element that detects the position of the rotor 60, etc., are mounted on the board 58. The lead-wire guide part 61, which guides the lead wire to the outside, is attached to the cut portion of the board 58 at a position near the outer peripheral edge of the board 58.

In addition, the position detection magnet 410 and the sleeve bearing 66 are manufactured.

In addition, the magnet assembly 68 is manufactured. The magnet assembly 68 is manufactured by attaching the sintered magnets 402 and the back yoke 403 to the first magnet holder 400 and the second magnet holder 401.

(3) Step 3

The stator 47 is manufactured by attaching the board 58. The board 58 to which the lead-wire guide part 61 is attached is fixed to the insulating portions 56 with the board pressing member 95.

In addition, the impeller 60b is manufactured. The impeller 60b is molded from a thermoplastic resin, such as polyphenylene ether (PPE).

In addition, the rotor portion 60a is manufactured. The rotor portion 60a includes the ring-shaped (cylindrical) magnet assembly 68; the thin ring-shaped position detection magnet 410 molded from pellets formed by kneading powder of a magnetic material, such as ferrite, and resin; and the cylindrical sleeve bearing 66 (formed of, for example, carbon) provided inside the magnet assembly 68. The magnet assembly 68, the position detection magnet 410, and the sleeve bearing 66 are molded integrally together with a resin, such as polyphenylene ether (PPE).

(4) Step 4

The board 58 is subjected to soldering. The terminals 59 (power supply terminals to which power is supplied and a neutral terminal) are soldered on the board 58.

In addition, the shaft 70, the thrust bearing 71, and the cup-shaped partition wall component 90 are manufactured. The shaft 70 is formed of SUS. The thrust bearing 71 is formed of ceramic.

In addition, the impeller 60b is attached to the rotor portion 60a by ultrasonic welding or the like.

(5) Step 5

The stator assembly 49 is manufactured. The stator assembly 49 is completed by attaching the pilot-hole component 81 to the stator 47.

In addition, the pilot-hole component 81 is formed.

In addition, the casing 41 is formed. The casing 41 is molded from a thermoplastic resin, such as polyphenylene sulfide (PPS).

In addition, the rotor 60 and other components are attached to the cup-shaped partition wall component 90.

(6) Step 6

The molded stator 50 is manufactured by molding the stator assembly 49.

In addition, the pump unit 40 is assembled by fixing the casing 41 to the cup-shaped partition wall component 90.

In addition, the self-tapping screws 160 are manufactured.

(7) Step 7

The pump 10 is assembled. The pump unit 40 is attached to the molded stator 50, and is fixed to the molded stator 50 with the self-tapping screws 160.

Figure 22:
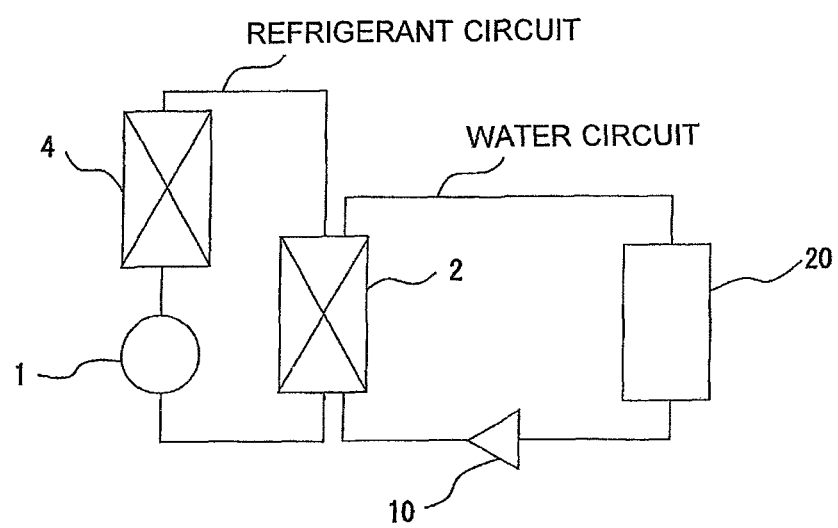
FIG. 22 is a conceptual diagram illustrating a circuit configuration of a refrigeration cycle apparatus according to Embodiment of the present invention which includes a refrigerant-water heat exchanger.

FIG. 22 is a conceptual diagram illustrating a refrigeration cycle apparatus including the refrigerant-water heat exchanger 2. The heat-pump-type hot-water supplying apparatus 300 illustrated in FIG. 1 is an example of a refrigeration cycle apparatus including the refrigerant-water heat exchanger 2.

The apparatus including the refrigerant-water heat exchanger 2 is, for example, an air-conditioning apparatus, a floor heating apparatus, or a hot-water supplying apparatus. The pump 10 according to Embodiment is mounted in a water circuit of the apparatus including the refrigerant-water heat exchanger 2, and circulates water cooled by the refrigerant-water heat exchanger 2 or water heated by the refrigerant-water heat exchanger 2 (hot water) in the water circuit.

As illustrated in FIG. 22, the refrigeration cycle apparatus including the refrigerant-water heat exchanger 2 includes a refrigerant circuit including the compressor 1 (for example, a scroll compressor, a rotary compressor, etc.) that compresses refrigerant, the refrigerant-water heat exchanger 2 that causes the refrigerant and water to exchange heat, and the evaporator 4 (heat exchanger). The apparatus also includes a water circuit including the pump 10, the refrigerant-water heat exchanger 2, and a load 20. Thus, the refrigerant circuit and the water circuit are connected to each other with the refrigerant-water heat exchanger 2 so as to transfer heat therebetween.

In the case where the pump 10 including the rotor 60 of an electric motor for a pump is applied to the refrigeration cycle apparatus including the refrigerant-water heat exchanger 2, since the performance and quality of the pump 10 are improved and the productivity of the pump 10 is increased, the performance and quality of the refrigeration cycle apparatus including the refrigerant-water heat exchanger 2 can be improved and the cost of the apparatus can be reduced.

The invention claimed is:

1. A pump comprising:
   a molded stator including a board on which a magnetic-pole-position detection element is mounted; and
   a rotor including a rotor portion that is rotatably accommodated in a cup-shaped partition wall component, the rotor portion opposing the magnetic-pole-position detection element at one end and having an impeller attachment portion for attaching an impeller at another end,
   wherein, the rotor portion includes
      a magnet including an impeller-attachment-portion-side end portion and a magnetic-pole-position-detection-element-side end portion,
      a first magnet holder having a ring shape with an opening and a recess, the impeller-attachment-portion-side end portion of the magnet being held in the recess of the first magnet holder,
      a second magnet holder having a ring shape with an opening, a first surface and a second surface, the first surface being provided on a first side of the second magnet holder and facing the magnet and having a recess, the second surface being provided on another side of the second magnetic holder opposite the first side and facing away from the magnet, and the magnetic-pole-position-detection-element-side end portion of the magnet being inserted into the recess of the first surface of the second magnet holder,
      a back yoke disposed inside the magnet,
      a sleeve bearing disposed inside the back yoke, and
      a position detection magnet provided on the second surface of the second magnet holder at a location permitting detection of a magnetic flux of the position detection magnet by the magnetic-pole-position detection element, and wherein the magnet, the first magnet holder, the second magnet holder, the back yoke, the sleeve bearing, and the position detection magnet are assembled integrally together with a thermoplastic resin, and the impeller attachment portion is formed of the thermoplastic resin.

2. The pump of claim 1,
wherein the second surface of the second magnet holder includes a plurality of projections extending toward the position detection magnet, and
wherein the position detection magnet has a ring shape with an opening, the position detection magnet including
   a step formed at an inner periphery of the opening of the position detection magnet, the step being pressed against the projections in a state in which the position detection magnet is attached to the second magnet holder, and
   a plurality of ribs formed on the step, the ribs suppressing rotation of the position detection magnet in the state in which the position detection magnet is attached to the second magnet holder.

3. The pump of claim 2,
wherein the position detection magnet includes another step formed at the inner periphery of the opening of the position detection magnet, and the second magnet holder includes another plurality of ribs provided on the another step, and each of a magnetic-pole-position-detection-element-side end surface of the rotor portion and a magnet-side end surface at a side opposite to the magnetic-pole-position-detection-element-side end surface including one of the step and plurality of ribs and the another step and the another plurality of ribs.

4. The pump of claim 1,
wherein the position detection magnet opposes the magnetic-pole-position detection element.

5. The pump of claim 1,
wherein the position detection magnet is formed of a resin magnet.

6. The pump of claim 1,
wherein the magnet has a cylindrical shape and includes a plurality of sintered magnets extending from the first magnet holder toward the second magnet holder and being held by the first magnet holder and the second magnet holder with the sintered magnets being substantially parallel to each other.

7. The pump of claim 1,
wherein the second magnet holder has a plurality of cuts that are arranged radially in a magnetic-pole-position-detection-element-side end surface of the rotor portion, the cuts allowing the magnet to be positioned in a rotational direction and arranged coaxially with the sleeve bearing.

8. The pump of claim 1,
wherein the first magnet holder includes a plurality of projections having a substantially angular shape and arranged in a hollow portion of the magnet with substantially constant intervals therebetween in a circumferential direction, the projections extending in an axial direction toward an impeller-side end surface, which is an end surface in a side on which the impeller is provided.

9. A refrigeration cycle apparatus in which a refrigerant circuit and a water circuit are connected to each other with a refrigerant-water heat exchanger, wherein the pump of claim 1 is mounted in the water circuit.

10. The pump of claim 1,
wherein the rotor portion includes a plurality of the magnets,
wherein the first magnet holder includes a plurality of the recesses, and each of the impeller-attachment-portion-side end portions of the magnets is inserted to one of the recesses of the first magnet holder,
wherein the second magnet holder includes a plurality of the recesses, and each of the magnetic-pole-position-detection-element-side end portions of the magnets is inserted to one of the recesses of the second magnet holder.

11. A method for manufacturing a pump, the method comprising:
assembling a magnet assembly by steps of
   attaching a back yoke to a first magnet holder including a first recess and a second magnet holder including a second recess and a projection configured as a base to receive a position detection magnet, and
   inserting one end of a sintered magnet into the recess of the first magnet holder and another end of the sintered magnet into the recess of the second magnet holder;
winding a wire around a stator core;
assembling a stator by attaching a board to the stator core around which the wire has been wound, and forming a rotor portion by molding the magnet assembly, the position detection magnet, and a sleeve bearing integrally together;
soldering a terminal of the stator to the board and forming a rotor by assembling an impeller and the rotor portion integrally together;
attaching a cup-shaped partition wall component to the rotor;
forming a stator assembly by attaching a pilot-hole component to the stator, forming a molded stator by molding the stator and the pilot-hole component integrally together, and assembling a pump unit by fixing a casing to the cup-shaped partition wall component attached to the rotor; and
attaching the pump unit to the molded stator and fixing the pump unit to the molded stator with a tapping screw.

12. The method for manufacturing the pump of claim 11,
wherein the first magnet holder has another recess having a substantially angular shape, the another recess being formed in an impeller-side end surface of the first magnet holder and arranged radially,
wherein the another recess and the projection configured as a base to receive the position detection magnet are provided in the thermoplastic resin when the magnet assembly, the position detection magnet, and the sleeve bearing are molded integrally together with a thermoplastic resin.

13. The method for manufacturing the pump of claim 11,
wherein the second magnet holder has a plurality of cuts that are arranged radially in a magnetic-pole-position-detection-element-side end surface of the rotor portion, the cuts allowing the sintered magnet to be positioned in a rotational direction and arranged coaxially with the sleeve bearing.

14. The method for manufacturing the pump of claim 11,
wherein the first magnet holder includes a plurality of projections having a substantially angular shape and arranged in a hollow portion of the sintered magnet with substantially constant intervals therebetween in a circumferential direction, the projections extending in an axial direction toward the impeller-side end surface and being pressed by a mold in the integral molding process for forming the rotor.

* * * * *